United States Patent
Bergmann et al.

(10) Patent No.: US 6,886,755 B2
(45) Date of Patent: May 3, 2005

(54) SANITARY MIXING UNIT

(75) Inventors: Konrad Bergmann, Trier (DE); Josef Ems, Wittlich (DE)

(73) Assignee: Ideal-Standard GmbH & Co. OHG, Bonn (DE)

( * ) Notice: Subject to any disclaimer, the term of this patent is extended or adjusted under 35 U.S.C. 154(b) by 0 days.

(21) Appl. No.: 10/381,935

(22) PCT Filed: Sep. 8, 2001

(86) PCT No.: PCT/EP01/10383

§ 371 (c)(1),
(2), (4) Date: Aug. 18, 2003

(87) PCT Pub. No.: WO02/27420

PCT Pub. Date: Apr. 4, 2002

(65) Prior Publication Data

US 2004/0035943 A1 Feb. 26, 2004

(30) Foreign Application Priority Data

Sep. 29, 2000 (DE) .......................................... 100 48 044

(51) Int. Cl.$^7$ ............................................. G05D 23/13
(52) U.S. Cl. .................................. 236/12.2; 137/625.4
(58) Field of Search ..................... 236/12.2; 137/625.17, 137/625.4

(56) References Cited

U.S. PATENT DOCUMENTS

| | | | |
|---|---|---|---|
| 2,628,781 A | 2/1953 | Cantalupo | |
| 4,299,354 A * | 11/1981 | Ketley | 236/12.11 |
| 5,979,777 A | 11/1999 | Ems | |
| 6,360,956 B1 * | 3/2002 | Taylor et al. | 236/12.2 |
| 6,557,770 B2 * | 5/2003 | Mace et al. | 236/12.1 |

FOREIGN PATENT DOCUMENTS

| | | |
|---|---|---|
| DE | 1112360 | 8/1961 |
| DE | 15 50 252 A | 1/1970 |
| DE | 81 11 858 | 12/1989 |
| DE | 44 23 853 A1 | 1/1996 |
| GB | 861 708 A | 2/1961 |
| WO | WO 79/00697 | 9/1979 |

* cited by examiner

*Primary Examiner*—William E Tapolcai
(74) *Attorney, Agent, or Firm*—Nixon Peabody LLP; David S. Safran

(57) ABSTRACT

A sanitary mixing unit (1), in particular for wall installation, has a thermostatic device with a thermostatic element (16), and an excess travel spring (40) and a return spring (41) which act on the thermostatic element (16). A a sanitary mixing unit which is of simple and economical construction and with a low installation depth may be provided by the excess travel spring (40) and the return spring (41) acting on the thermostatic element (16) in the same direction, such that, in the case of excess travel, the spring forces of the excess travel spring (40) and the return spring (41) are additive.

11 Claims, 4 Drawing Sheets

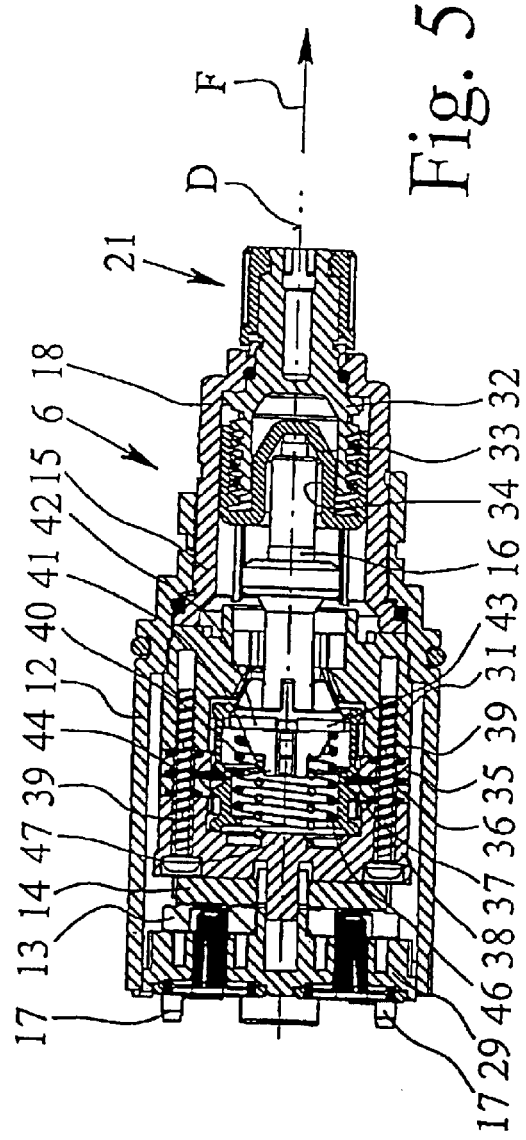

SANITARY MIXING UNIT

BACKGROUND OF THE INVENTION

1. Field of the Invention

The invention relates to a sanitary mixing faucet, especially for wall installation, with a thermostat means which has a thermostatic element, an over-travel spring and a reset spring acting on the thermostatic element.

2. Description of Related Art

A sanitary mixing faucet of the initially mentioned type is already known from published German Patent Application 195 02 147. In the known mixing faucet, the reset spring acts on one end of the thermostatic element, while the over-travel spring acts on the other end of the thermostatic element. In the known mixing faucet, the reset spring and the over-travel spring therefore act in the opposite direction, the over-travel spring generally having twice the spring force as the reset spring. Otherwise, in the known mixing faucet, the reset spring is used in conjunction with a multi-part reset means, while the over-travel spring is part of a multi-part over-travel unit. Ultimately, based on the arrangement of the reset spring, on the one hands and the over-travel spring, on the other, which arrangement is provided on opposite sides, and especially in conjunction with the reset means and the over-travel unit, a considerable amount of space is required; accordingly, this has an adverse effect on the construction depth of the mixing faucet. Moreover, the reset spring and the over-travel unit are comparatively complex assemblies; this has an adverse effect in terms of cost.

SUMMARY OF THE INVENTION

The object of this invention is to provide a mixing faucet of the initially mentioned type, which has a simple and economical structure and small structural depth.

The aforementioned object is essentially achieved in accordance with the invention in that the over-travel spring and the reset spring act on the thermostatic element in the same direction, so that the spring forces of the over-travel spring and the reset spring are added to one another in the case of an over-travel. In the embodiment in accordance with the invention, for the first time, a novel arrangement of the two springs is used, the over-travel spring and the reset spring being located on the same side with respect to the thermostatic element. This can greatly benefit the structural depth of the mixing faucet. Moreover, in the embodiment in accordance with the invention, in the case of over-travel, not only the over-travel spring, but also the reset spring act, and thus, the spring forces are added; ultimately, this results in the fact the an over-travel spring with a smaller spring force can be used.

In the embodiment which has an especially small space requirement, the over-travel spring and the reset spring are each made as helical springs, one spring being located within the other. By the arrangement of one spring within the other spring, no more space is required than is necessary anyway for the larger of the springs.

So that the two springs can easily engage the thermostatic element, a receiving part is provided which adjoins the thermostatic element on one side and the over-travel spring and the reset spring jointly on an opposite side. In this way, a conventional thermostatic element can be used.

Preferably, with respect to a space-saving execution, there is a temperature control part which is made as a sleeve and the over-travel spring and reset spring are located within the temperature control part. Thus, ultimately, the space which is necessary anyway for the temperature control part is now used for the two springs, without the need for special additional space for the springs. In this connection, it is a good idea for the over-travel spring to be supported on the peripheral collar which is preferably provided within the temperature control part, while the reset spring is supported on a housing part which is stationary in the axial direction relative to the temperature control part.

Moreover, it is advantageous if the receiving part is located within the temperature control part, the entire execution of the cartridge being such that the supplied hot water is routed through the temperature control part. This ensures that unmixed hot water flows onto the receiving part in the inflow direction. In this connection, it is an especially good idea to allow the thermostatic element to rest with its thermostatic area against the receiving part such that a smaller part of the thermostatic area is exposed to the flow of unmixed hot water, the larger part of the thermostatic area being exposed to the flow of mixed water. The partial exposure of the thermostatic area of the thermostatic element to the flow of unmixed hot water leads to movement of the temperature control part which is made as a sleeve in the "cold" direction, the hotter the incoming hot water. In this way, it is possible to compensate for the systematic error of thermostats of conventional design which arises when the inflow temperature of the hot water fluctuates.

Finally, it is preferred that the arrangement of the over-travel spring and the reset spring in accordance with the invention be implemented in a cartridge which represents an inherently manageable and closed unit. It goes without saying that this invention also relates to one such cartridge.

One embodiment of this invention is explained in detail below with reference to the accompanying drawings.

BRIEF DESCRIPTION OF THE DRAWINGS

FIG. 5 is a cross-sectional view of a cartridge in accordance with the invention, FIG. 6 is a cross-sectional view of a cartridge in accordance with the invention rotated 90° about its longitudinal axis relative to the representation in FIG. 5.

DETAILED DESCRIPTION OF THE INVENTION

Figure 2:
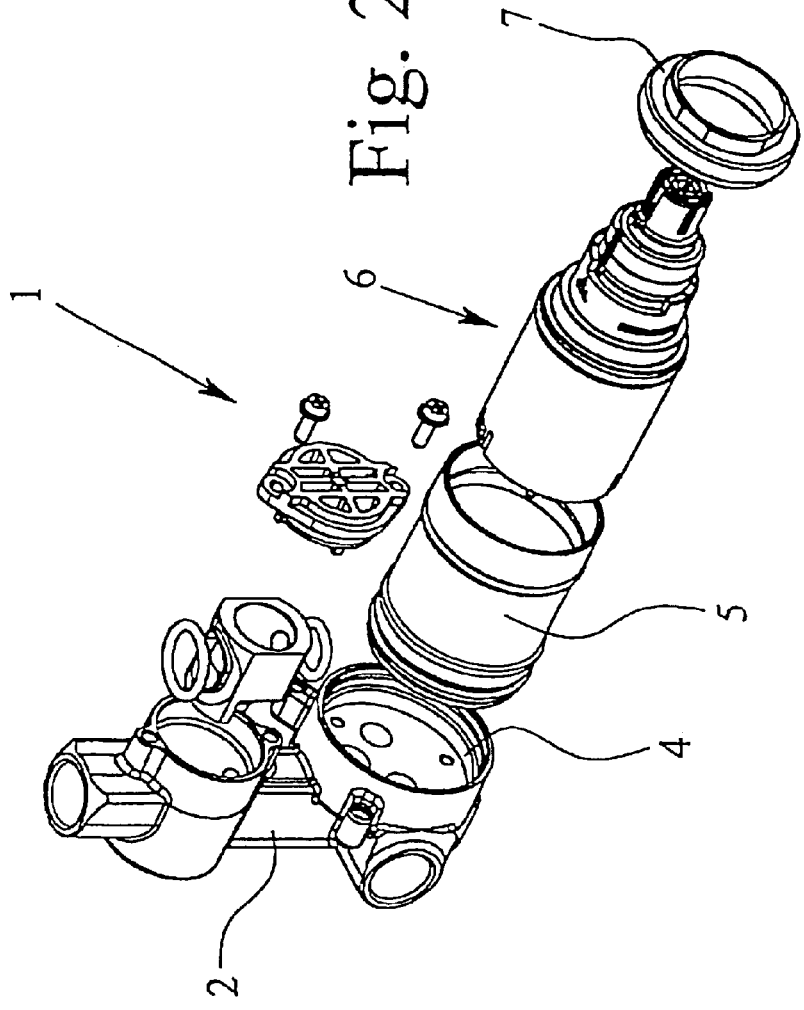
FIG. 2 is an exploded view of the part of the sanitary mixing faucet shown in FIG. 1.
Figure 1:
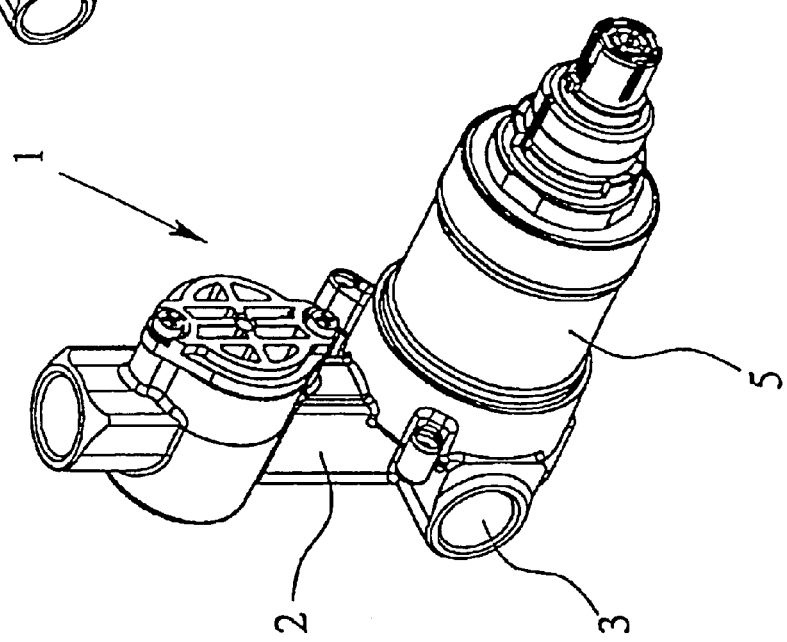
FIG. 1 is a perspective view of part of the mixing faucet in accordance with the invention.

FIGS. 1 and 2 show a portion of a sanitary mixing faucet 1 which is intended especially for wall installation. The mixing faucet 1 has a base body 2 which has a cold water supply connection 3, and has a hot water supply connection on the opposite side (not shown). A receiving sleeve 5 for the cartridge 6 is locked into the receiver 4 of the base body 2. The cartridge 6 makes it possible to adjust the amount and temperature of the mixed water. For this purpose, the mixing faucet 1 has a quantity adjustment means and a temperature adjustment means in the cartridge. Furthermore, there is a thermostat means in the cartridge 6. The cartridge 6 is fixed in or on the receiving sleeve 6 via a locking nut 7.

Figure 3:
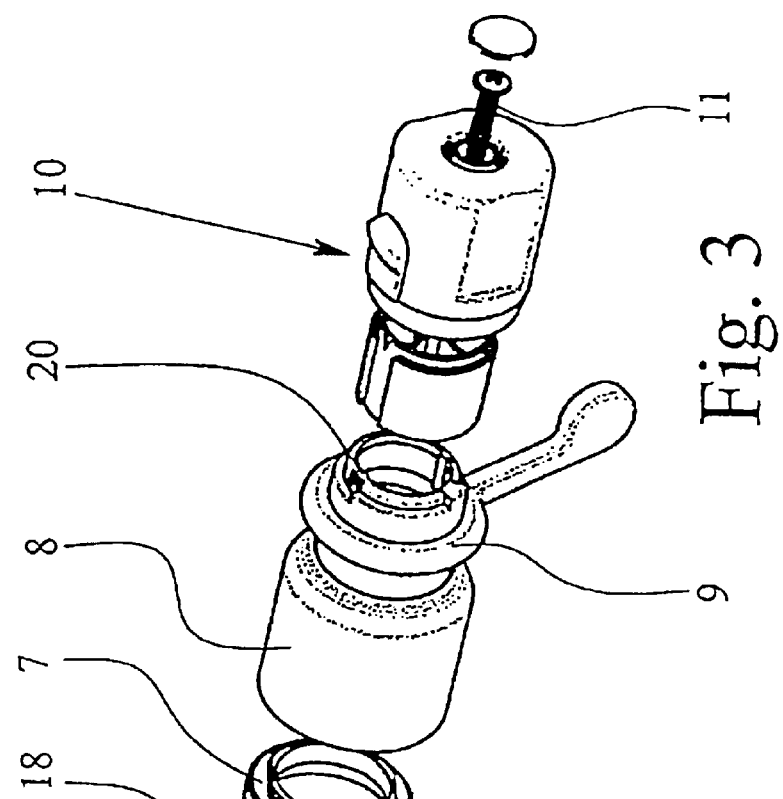
FIG. 3 is an exploded view of parts of the mixing faucet in accordance with the invention.
Figure 4:
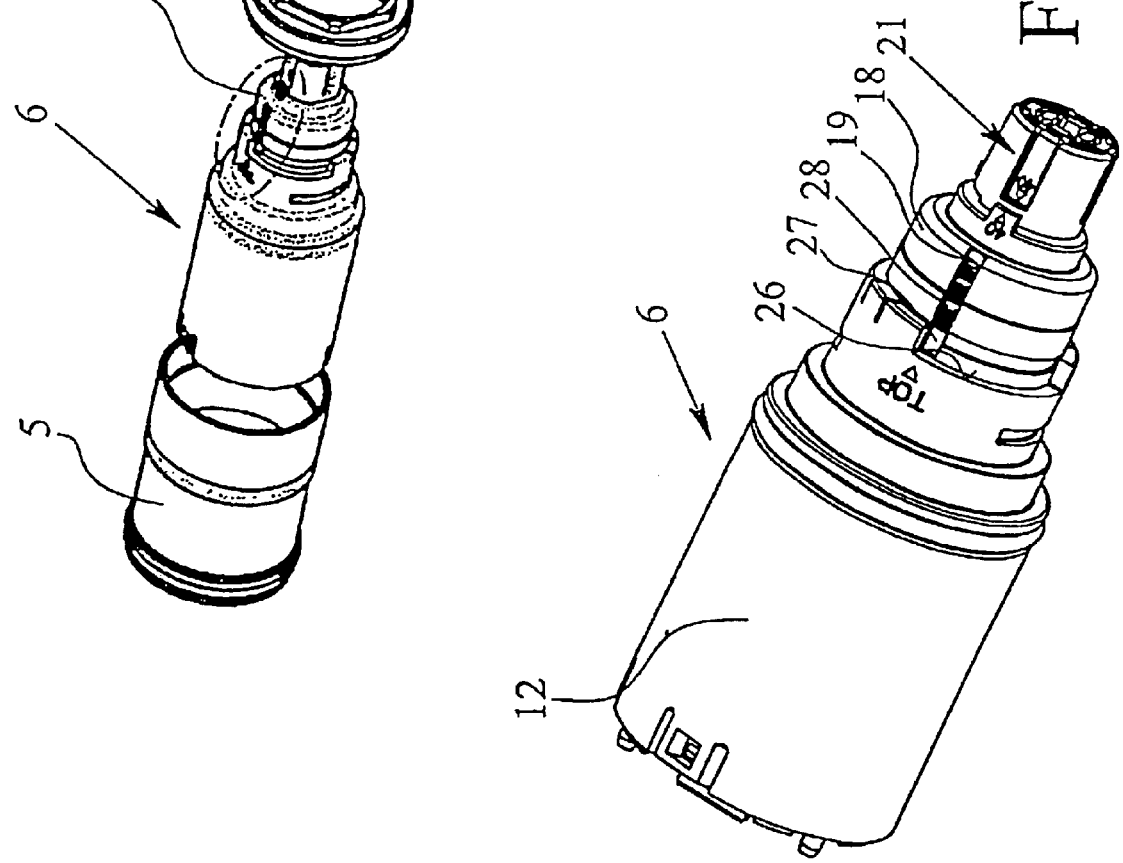
FIG. 4 is an enlarged perspective of a cartridge in accordance with the invention.

Supplementing the parts shown in FIG. 2, FIG. 3 shows a covering sleeve 8 which is pushed over the receiving sleeve 5, a first twist operating handle 9 and a second twist operating handle 10 which is composed of several parts and which can be attached to the front of the cartridge 6 via a screw 11.

As follows especially from FIGS. 5 and 6, the mechanism for controlling the quantity and temperature is implemented in or on the cartridge 6. For this purpose, the cartridge 6 itself has an outside housing 12 in which, among other things, there are a stationary valve disk 13 and a rotating valve disk 14 of the quantity adjustment means which interacts with it.

It is significant, at this point, that the inside housing 15 can be coaxially turned in the outside housing 12 by at least 180° around the axis D which is the central lengthwise axis of the cartridge 6. There is a thermostat means which has a thermostatic element 16 in the inside housing 15 and it is thus turned at the same time as the inside housing 15 is turned relative to the outside housing 12. Furthermore, the rotating valve disk 14 is rotationally fixed on the inside of housing 15 so that the valve disk 14 is turned at the same time as the inside housing 15 is turned relative to the outside housing 12. Conversely, the stationary valve disk 13 is rotationally fixed relative to the outside housing so that, when the inside housing 15 turns, motion of the movable valve disk 14 takes place relative to the stationary valve disk 13, which is not moving.

As a result, the aforementioned configuration means that the cartridge 6, which is inserted into the receiving sleeve 5 and the receiver 4 of the base body 2, need not be removed from the above described installation position for adaptation to the respective structural circumstances, but that, simply, the inside housing 15 need only be turned by 180° around the axis D in order to ensure faultless operation of the mixing faucet 1, depending on the location of the water supply connections. In this connection, in order to otherwise prevent the outside housing 12 from turning at the same time as the inside housing 15 turns, there are corresponding fixing projections 17 on the end of the cartridge 6 for interaction with openings in particular on the base body 2 and on the receiver 4 (not shown).

On the end face, i.e., on the side facing the user, the inside housing 15 is routed out of the outside housing 12 with the engagement section 18. The first twist operating handle 9 for adjustment of the quantity can be slipped onto the engagement section 18. To slip the first twist operating handle 9 onto the engagement section 18 and for preventing relative rotation of the twist operating handle 9, a groove 19 is provided which runs in the lengthwise direction of the cartridge 6 and which interacts with a corresponding projection 20 on the first twist operating handle 9. In the embodiment shown, there are grooves corresponding to projections 20 on opposite sides of the engagement section 18 and in the corresponding insertion opening of the first twist operating handle 9.

To be able to adjust not only the quantity, but also the temperature, from the end face of the cartridge 6, the temperature adjustment means has an engagement section 21 which projects out of the end face of inside housing 15 for seating of the second twist operating handle 10. In the installed state, with the twist operating handles 9, 10 attached, the first twist operating handle 9 and the second twist operating handle 10 have the same axis of rotation, i.e., the axis D.

Figure 7:
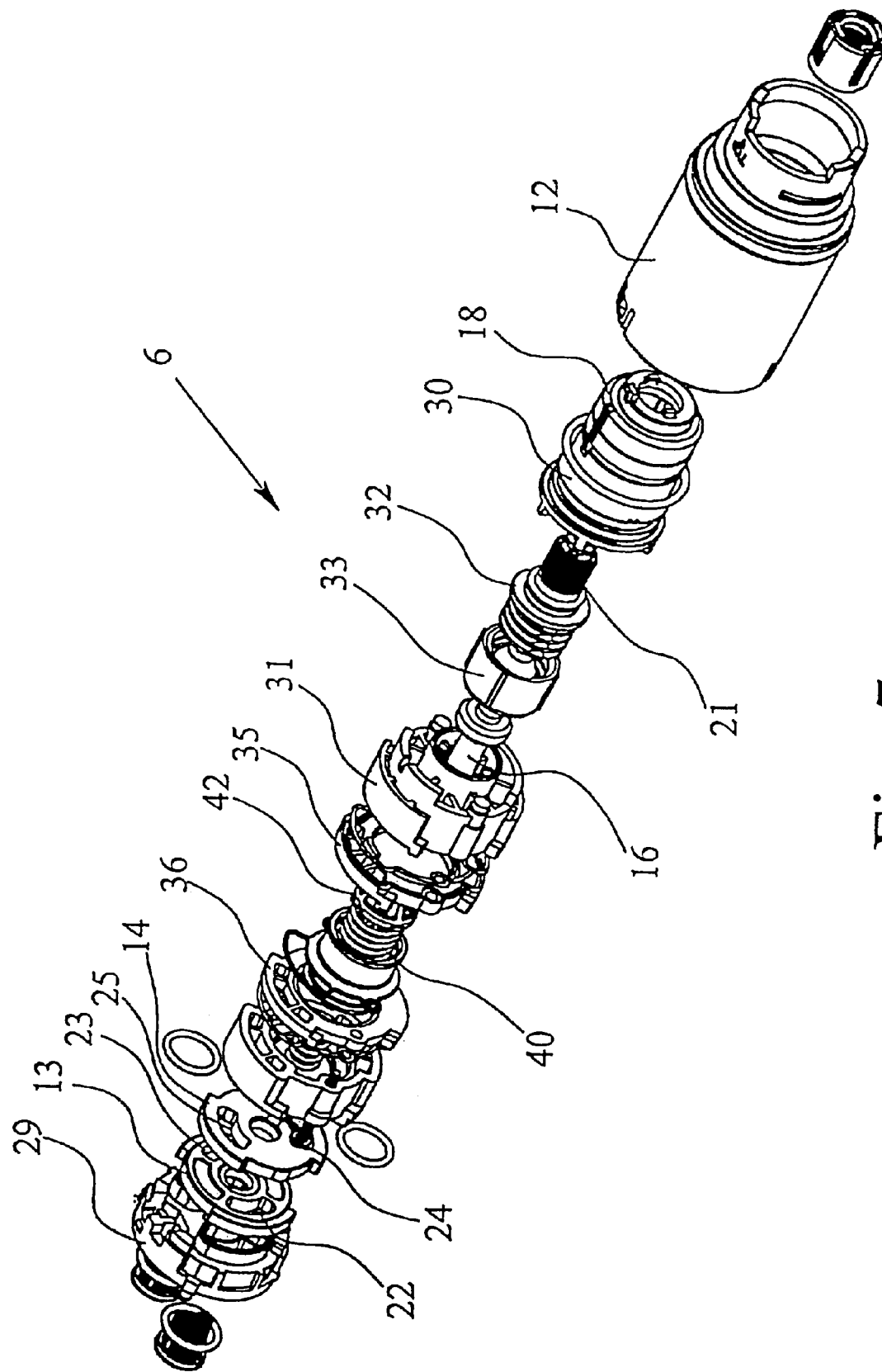
FIG. 7 is an exploded view of the individual parts of the cartridge in accordance with the invention.

As follows from FIG. 7, the valve openings 22, 23, 24, 25 which are provided in the two valve disks 13, 14 extend over less than 90°, the maximum opening cross section arising after a rotary motion of roughly 90°.

Basically, it can be provided that the inside housing 15 can be turned by only 180° relative to the outside housing 12 by the corresponding stops. However, there are no such stops here. For adjusting the quantity, there are means for limitation of the rotation of the first twist operating handle 9 which enable it to be rotated by only roughly 90°. In particular, the means for limiting rotation of the first twist operating handle 9 has a guide groove 26 which runs on the periphery of the outside housing 12 and into which the projection 20 fits. The guide groove 26 extends over an arc length of roughly 90° so that the maximum rotation of the first twist operating handle 9 is dictated thereby. Otherwise, on the outside housing 12 and on the projecting engagement section 18 of the inside housing 15, corresponding markings 27, 28 are provided for indicating the state of rotation of the inside housing 15 relative to the outside housing 12.

As follows especially from FIGS. 5 and 6, the cartridge 6 with the components contained therein represent an inherently manageable and closed unit. The cartridge 6 is comprised of a host of components which are shown in particular in FIG. 7, even if not all parts are described in particular. A bottom plate 29 is locked to the outside housing 12 to close the cartridge 6. Here, the fixed valve disk 13 on the bottom plate 29 so that, in this way, relative rotation with respect to the outside housing 12 easily prevented.

As follows from FIG. 5 to 7, the inside housing 15 is made in several parts; adjacent parts of the inside housing 15 are connected so that relative rotation with respect to one another does not occur. The inside housing 15 has an upper inside housing part 30 with the engagement section 18. The inside housing part 30 is connected to the inside housing part 31, between the inside housing parts 30, 31 there being a set screw 32 and an adjustable nut 33 for achieving axial motion of the thermostatic element 16 and the associated components. On the outside, on the set screw 32, there is an engagement section 21 for the second twist operating handle 10 for adjustment of the temperature. Furthermore, between the two inside housing parts 30, 31, there is a thermostatic element 16 which is made as an expansion element and which is held with one end in the corresponding receiver 34 of the adjustable nut 33.

The inside housing part 31 adjoins two other comparatively narrow inside housing parts 35, 36, between which a sealing membrane 37 is held. Finally, there is a lower inside housing part 38 which adjoins the inside housing part 36. For bracing the sealing membrane 37, the inside housing parts 31, 35, 36 and 38 are attached to one another via the corresponding screws 39.

As follows especially from FIGS. 5 and 6, an over-travel spring 40 and a reset spring 41 which are located likewise within the cartridge 6 act on the thermostatic element 16. In this connection, it is important that the over-travel spring 40 and the reset spring 41 act on the thermostatic element 16 in the same direction, here specifically in the direction of the arrow F so that the spring forces of the over-travel spring 40 and the reset spring 41 are added to one another in the case of an over-travel, therefore when the length of the thermostatic element changes.

In this embodiment, the over-travel spring 40 and the reset spring 41 are located on the same side of the thermostatic element 16. Here, an especially space-saving arrangement is achieved in that the over-travel spring 40 and the reset spring 41 are each made as helical springs, the reset spring 41 being located within the over-travel spring 40.

To transfer the spring forces of both the over-travel spring 40 and also the reset spring 41 to the thermostatic element 16 and to make contact between these springs and one end of the thermostatic element 16, a cross-shaped receiving part 42 is provided which has flow openings. The receiving part 42 has an external flange-like engagement section 43 and an axially extending journal 44. The over-travel spring 40 adjoins the engagement section 43, while the reset spring 41 is seated on the journal 44. The thermostatic element 16 rests on the opposite side of the receiving part 42. The over-travel spring 40 and the reset spring 41 have roughly the same spring force, specifically roughly 50 N each.

Here, a sleeve which is supported in the inside housing 15 is used as the temperature control part 45 on which the thermostatic element 16 acts. The receiving part 42 is located within the temperature control part 45 and is pressed via the over-travel spring 40 against the inner stop of the temperature control part 45. The temperature control part 45 has control edges on its end faces for the hot and cold water. With reference to FIGS. 5 and 6, the hot water control edge is located on the left side, the cold water control edge on the right side of the temperature control part 45. The hot water, in the unmixed state, strikes not only the receiving part 42 which is located within the temperature control part 45, but also the thermostatic area of the thermostatic element 16 which directly adjoins the receiving part 42. This ensures that the unmixed hot water flow flows against part, preferably the smaller part, of the thermostatic area of the thermostatic element 16, while mixed water flows around the other, larger part of the thermostatic area of the thermostatic element 16.

In order to optimally use the available space in the inside housing 15, the over-travel spring 40 and the reset spring 41 are located within the temperature control part 45. In doing so, the over-travel spring 40 which is used to reset the temperature control part 45 is supported on the side opposite the receiving part 42 on the peripheral collar 46 of the temperature control part 45, while the reset spring 41 which is used also to hold the thermostatic element 16 is supported on the inside housing part 38. For this reason, there is a corresponding journal 47 on which the reset spring 41 is seated.

What is claimed is:

1. Sanitary mixing faucet, comprising:
    a housing,
    a thermostat means with a thermostatic element for controlling the temperature of a flow of mixed hot water and cold water formed in the faucet,
    a temperature control part comprised of a sleeve,
    an over-travel spring, and a reset spring acting on the thermostatic element located in said sleeve,
    wherein the over-travel spring and the reset spring act on the thermostatic element in the same direction so that spring forces of the over-travel spring and the reset spring are added to one another during over-travel;
    wherein the over-travel spring is supported on a peripheral collar within the sleeve,
    wherein the reset spring is supported on a part of the housing which is stationary in an axial direction relative to the sleeve;
    wherein a receiving part is provided, one side of the receiving part being adjoined by the thermostatic element and an opposite side of the receiving part being adjoined by the over-travel spring and the reset spring; and
    wherein the receiving part is located within the temperature control part, hot water supplied to said faucet being routed through the temperature control part;
    wherein the over-travel spring and the reset spring are helical springs, and wherein one spring is located within the other; and
    wherein the thermostatic element has a thermostatic area which rests against the receiving part, wherein the thermostatic area has a first part which exposed to a flow of unmixed hot water and a second part which is exposed to said flow of mixed hot and cold water.

2. Sanitary mixing faucet in accordance with of claim 1, wherein the over-travel spring and the reset spring exert essentially the same spring force.

3. Sanitary mixing faucet as claimed in claim 1, wherein the over-travel spring and the reset spring are located in a cartridge.

4. Sanitary mixing faucet as claimed in claim 3, wherein the cartridge is sealed and constitutes a self-contained unit.

5. Sanitary mixing faucet in accordance with claim 1, wherein the over-travel spring and the reset spring are helical springs, and wherein one spring is located within the other.

6. Sanitary mixing faucet in accordance with claim 5, wherein the over-travel spring and the reset spring exert essentially the same spring force.

7. Sanitary mixing faucet as claimed in claim 6, wherein the receiving part is located within the temperature control part, hot water supplied to said faucet being routed through the temperature control part.

8. Sanitary mixing faucet as claimed in claim 7, wherein the over-travel spring and the reset spring are located in a cartridge.

9. Sanitary mixing faucet as claimed in claim 8, wherein the cartridge is sealed and constitutes a self-contained unit.

10. Sanitary mixing faucet, comprising:
    a housing,
    a thermostat means with a thermostatic element for controlling the temperature of a flow of mixed hot water and cold water formed in the faucet,
    a temperature control part comprised of a sleeve,
    an over-travel spring, and a reset spring acting on the thermostatic element located in said sleeve,
    wherein the over-travel spring and the reset spring act on the thermostatic element in the same direction so that spring forces of the over-travel spring and the reset spring are added to one another during over-travel;
    wherein the over-travel spring is supported on a peripheral collar within the sleeve,
    wherein the reset spring is supported on a part of the housing which is stationary in an axial direction relative to the sleeve;
    wherein a receiving part is provided, one side of the receiving part being adjoined by the thermostatic element and an opposite side of the receiving part being adjoined by the over-travel spring and the reset spring;
    wherein the receiving part is located within the temperature control part, hot water supplied to said faucet being routed through the temperature control part; and
    wherein the over-travel spring and the reset spring are located in a cartridge.

11. Sanitary mixing faucet as claimed in claim 10, wherein the cartridge is sealed and constitutes a self-contained unit.

* * * * *